(12) United States Patent
Cho

(10) Patent No.: US 8,848,017 B2
(45) Date of Patent: Sep. 30, 2014

(54) METHOD AND APPARATUS FOR SUPPORTING DATA SERVICE FOR QUALITY OF SERVICE IN PORTABLE TERMINAL USING TWO DIFFERENT OPERATING SYSTEMS

(75) Inventor: Sie-Joon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 12/986,514

(22) Filed: Jan. 7, 2011

(65) Prior Publication Data

US 2011/0175976 A1 Jul. 21, 2011

(30) Foreign Application Priority Data

Jan. 18, 2010 (KR) ........................ 10-2010-0004222

(51) Int. Cl.
| | |
|---|---|
| H04N 7/14 | (2006.01) |
| H04L 12/26 | (2006.01) |
| H04L 29/06 | (2006.01) |
| H04W 88/02 | (2009.01) |
| H04N 21/414 | (2011.01) |

(52) U.S. Cl.
CPC .......... H04L 65/1059 (2013.01); *H04W 88/02* (2013.01); *H04N 21/41407* (2013.01); H04L 65/80 (2013.01)
USPC ........................ 348/14.02; 370/241; 370/252

(58) Field of Classification Search
USPC ............ 348/14.01, 14.02, E07.077; 370/229
See application file for complete search history.

(56) References Cited

U.S. PATENT DOCUMENTS

| | | | | |
|---|---|---|---|---|
| 2006/0294112 | A1* | 12/2006 | Mandato et al. | ............... 707/100 |
| 2009/0322789 | A1* | 12/2009 | Dubs et al. | ................ 345/649 |
| 2010/0020717 | A1* | 1/2010 | McGregor et al. | ............ 370/252 |
| 2011/0113146 | A1* | 5/2011 | Li et al. | ......................... 709/228 |

FOREIGN PATENT DOCUMENTS

WO    WO2009/148400       * 12/2009

* cited by examiner

*Primary Examiner* — Duc Nguyen
*Assistant Examiner* — Theodore Ndje
(74) *Attorney, Agent, or Firm* — Jefferson IP Law, LLP

(57) ABSTRACT

A method and an apparatus for supporting a data service for Quality of Service (QoS) in a portable terminal using two different Operating Systems (OSs) are provided. The apparatus includes a QoS controller server, in an application chip, for sending a QoS control signal to a QoS controller client of a modem chip, the QoS controller client, in the modem chip, for controlling the modem chip based on the control signal received from the QoS controller server of the application chip, and a memory for providing a channel between the application chip and the modem chip.

24 Claims, 3 Drawing Sheets

METHOD AND APPARATUS FOR SUPPORTING DATA SERVICE FOR QUALITY OF SERVICE IN PORTABLE TERMINAL USING TWO DIFFERENT OPERATING SYSTEMS

PRIORITY

The present application claims the benefit under 35 U.S.C. §119(a) to a Korean patent application filed in the Korean Intellectual Property Office on Jan. 18, 2010, and assigned Serial No. 10-2010-0004222, the entire content of which is hereby incorporated by reference.

BACKGROUND OF THE INVENTION

1. Field of the Invention

The present invention relates generally to a portable terminal. More particularly, the present invention relates to a method and an apparatus for supporting a data service for quality of service in a portable terminal using two different operating systems.

2. Description of the Related Art

In recent $3^{rd}$ Generation (3G) mobile communication, data communication is increasing at a faster rate than voice communication. In this regard, 3G Partnership Project (3GPP) and 3GPP2 are developing 3G technology of improved versions to increase data capacity. The 3GPP has developed a High Speed Downlink Packet Access (HSDPA) technique for increasing downlink capacity by improving Wideband Code Division Multiple Access (WCDMA). To increase uplink capacity, the 3GPP suggests a High Speed Uplink Packet Access (HSUPA) technique. Meanwhile, to raise data throughput, the 3GPP2 standardizes 1xEVolution Data Only (EVDO) 2-Rev 0, 1xEVDO-Rev A, and 1xEVDO-Rev B by improving the existing Code Division Multiple Access (CDMA) 2000 technology. The 1xEVDO Rev. A standard can support Quality of Service (QoS) differentiated based on a media flow among packet data services. Data services requiring the QoS include video telephony, VoIP service, and the like.

While the 1xEVDO Rev. A standard defines a common Central Processing Unit (CPU) for supporting the QoS function in the video telephony or the Voice over Internet Protocol (VoIP) service, there is no precedent where the two CPUs are implemented in a platform. That is, the common CPU supporting the QoS for the data service executes application, Session Initiation Protocol (SIP) stack, and media codec based on the single Real Time Operating System (RTOS). By contrast, two-CPU environment independently running different Operating Systems (OSs) (e.g., Mobile Windows, Linux, and etc.) does not support software architecture for the QoS support.

In a software architecture supporting the EVDO QoS with a single CPU, the EVDO Rev. A stack supporting a packet QoS resides in the bottom of a protocol stack, a Point-to-Point Protocol (PPP) module resides above the EVDO Rev. A stack, a socket resides above the PPP module, and a media codec and a SIP stack reside on the socket. An application user interface resides on the media codec and the SIP stack. The PPP module connects the socket and the EVDO Rev. A stack. That is, with the single CPU, the QoS of the EVDO Rev. A stack can be provided only through the socket and is isolated from the external CPU.

A Windows Mobile device mostly includes a modem chip and an application chip. The modem chip provides only a wireless network access function, and the application chip processes the SIP stack, the media codec, the application, and the like. Hence, there is no means for using the QoS of the EVDO in the external chip under the single CPU structure, and novel software architecture is required to support the QoS with two CPUs.

Therefore, a need exists for a method and an apparatus for supporting Quality of Service (QoS) for a data service in a portable terminal using two different Operating Systems (OSs).

SUMMARY OF THE INVENTION

An aspect of the present invention is to address at least the above-mentioned problems and/or disadvantages and to provide at least the advantages described below. Accordingly, an aspect of the present invention is to provide a method and an apparatus for supporting a data service for Quality of Service (QoS) in a portable terminal using two different Operating Systems (OSs).

According to one aspect of the present invention, an apparatus for supporting a data service for QoS in a portable terminal using two different OSs is provided. The apparatus includes a QoS controller server, in an application chip, for sending a QoS control signal to a QoS controller client of a modem chip, the QoS controller client, in the modem chip, for controlling the modem chip based on the control signal received from the QoS controller server of the application chip, and a memory for providing a channel between the application chip and the modem chip.

According to another aspect of the present invention, a method for supporting a data service for QoS in a portable terminal using two different OSs includes sending, at a QoS controller server in an application chip, a QoS control signal to a QoS controller client of a modem chip, controlling, at the QoS controller client in the modem chip, the modem chip based on the control signal received from the QoS controller server of the application chip, and providing, at a memory, a channel between the application chip and the modem chip.

According to yet another aspect of the present invention, a method for supporting QoS of video telephony in a portable terminal using two different OSs includes sending, at an application chip, an Session Initiation Protocol (SIP) Invite message to an SIP server and receiving an SIP 200K message through a socket, after receiving the SIP 200K message, sending, at the application chip, an Internet Protocol (IP) address and a port number to a modem chip; and performing, at the modem chip, QoS negotiation with an access network based on the IP address and the port number.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will become more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for supporting Quality of Service (QoS) for a data service in a portable terminal using two different Operating Systems (OSs). More particularly, exemplary embodiments of the present invention provide a method for supporting a QoS based on EVolution Data Only (EVDO) in a portable terminal using two different Central Processing Units (CPUs).

Figure 1:
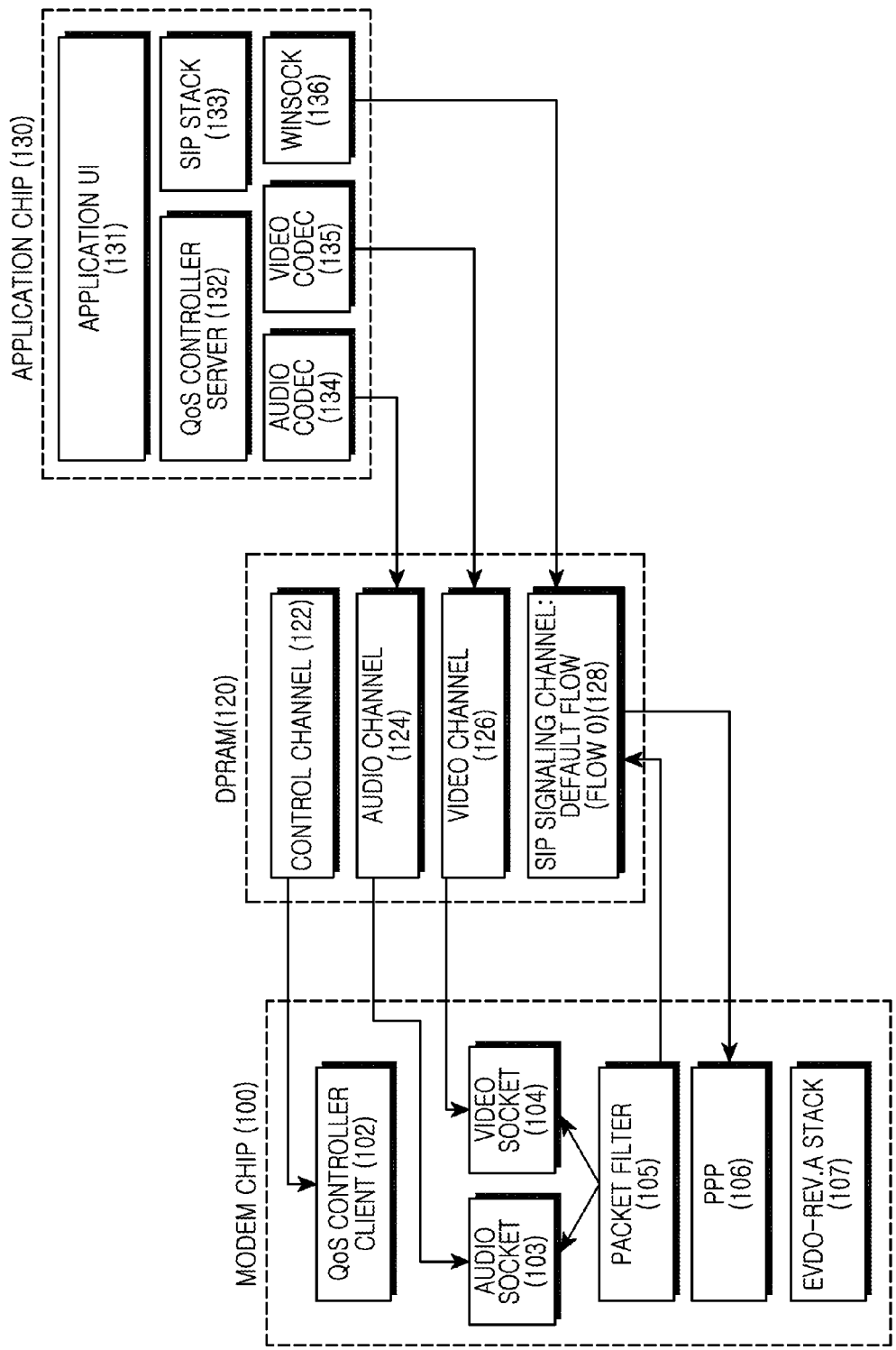
FIG. 1 is a block diagram of an apparatus for supporting a Quality of Service (QoS) for data service in a portable terminal using two different Operating Systems (OSs) according to an exemplary embodiment of the present invention.
Figure 2:
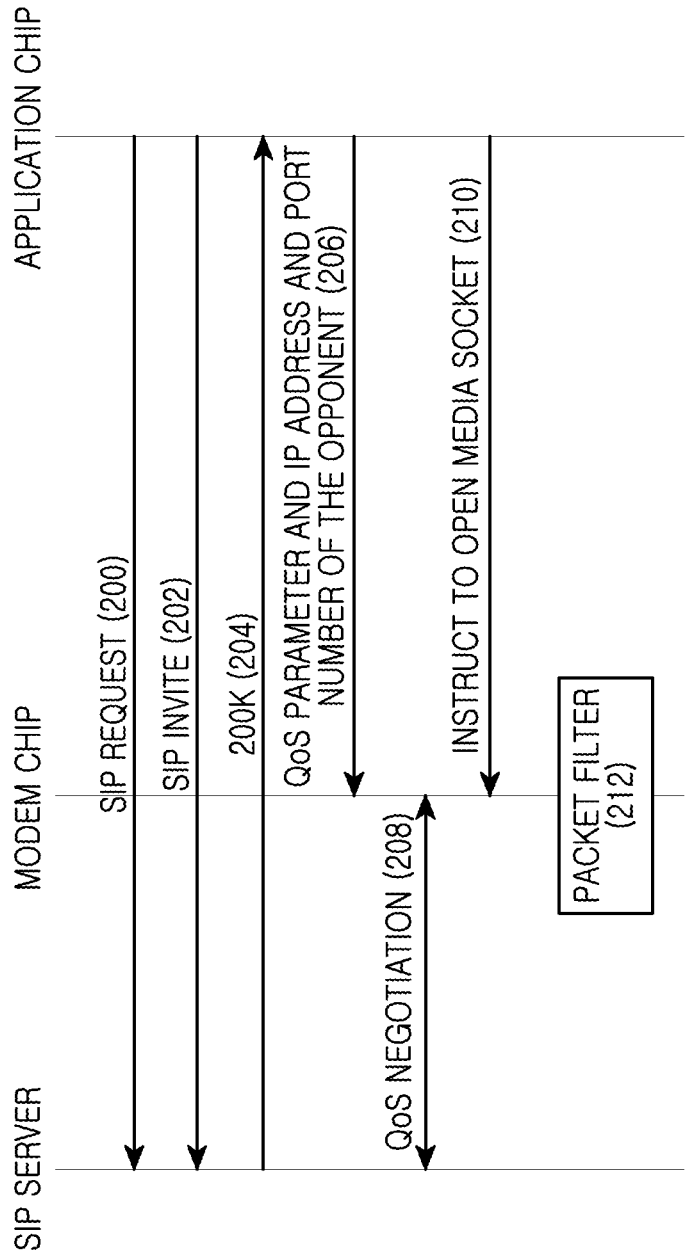
FIG. 2 is a diagram of a video telephony procedure of a QoS for data service according to an exemplary embodiment of the present invention.
Figure 3:
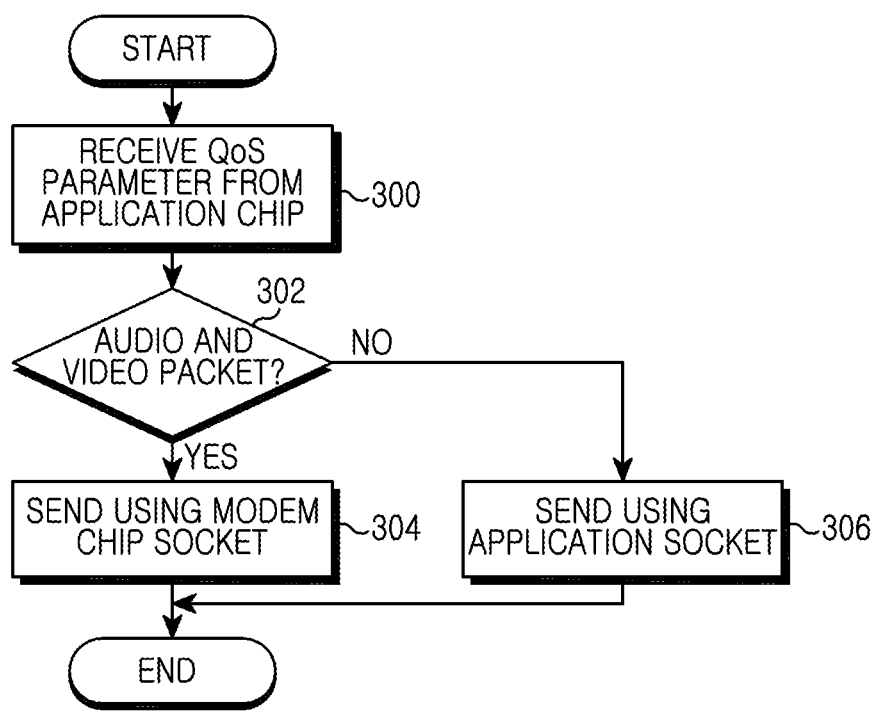
FIG. 3 is a flowchart of a method for supporting a QoS for data service in a portable terminal using two different OSs according to an exemplary embodiment of the present invention.

FIGS. 1 through 3, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram of an apparatus for supporting a QoS for data service in a portable terminal using two different OSs according to an exemplary embodiment of the present invention.

Referring to FIG. 1, a portable terminal for supporting a QoS for data service includes a modem chip 100, a Dual Port Random Access Memory (DPRAM) 120, and an application chip 130. Besides, the portable terminal can further include other function blocks, such as an input unit or an output unit. Herein, only function blocks for supporting the QoS with the two different CPUs are depicted.

The modem chip 100 may transmit, receive, and process high-capacity data, such as high-definition video, based on a radio network access function, and provide two service flows of different QoS levels at the same time. For doing so, the modem chip 100 includes a QoS controller client 102, an audio socket 103, a video socket 104, a packet filter 105, a Point-to-Point Protocol (PPP) module 106, and an EVDO Rev. A stack 107. The DPRAM 120 provides a control channel 122, an audio channel 124, a video channel 126, and a Session Initiation Protocol (SIP) signaling channel 128. The application chip 130, which is a central processor for processing an SIP stack, a media codec, and an application, includes an application User Interface (UI) 131, a QoS controller server 132, an SIP stack 133, an audio codec 134, a video codec 135, and a WinSock 136.

The QoS controller client 102 corresponds to the QoS controller server 132 of the application chip 130, controls the modem chip 100 based on a command received from the QoS controller server 132 over the control channel 122, and sends the QoS and a network event to the QoS controller server 132.

The audio socket 103 and the video socket 104 provide a virtual interface by providing corresponding audio and video application sockets. That is, the corresponding application software designates a socket which is the pair of an Internet Protocol (IP) address and a port to allow data transmission/reception regardless of a communication procedure when a link is opened.

The packet filter 105 forwards media packets, such as audio and video, to the audio socket 103 and the video socket 104, and forwards IP packets, such as Real-Time Transport Control Protocol (RTCP) packet or SIP signaling, to the WinSock 136 over the SIP signaling channel 128. Namely, the audio and video packets are delivered through the sockets 103 and 104 of the modem chip 100.

The PPP module 106 is an asynchronous serial data link protocol standard widely used to execute a dial-up Internet access. The PPP module 106 allows the data exchange between different network layers by negotiating with the opponent for a data transmission/reception condition and by encapsulating and exchanging data according to the negotiation.

The EVDO Rev. A stack 107 transmits, receives, and processes high-speed data by conducting the radio access function, based on a Code Division Multiple Access (CDMA) 1xEVDO standard. More particularly, the EVDO Rev. A stack 107 measures and monitors QoS parameters from various protocols, such as RTCP. The EVDO Rev. A stack 107 monitors and compares the negotiated QoS parameters with actual parameter values. The EVDO Rev. A stack 107 collects information relating to the QoS parameter of the current EVDO standard from the RTCP.

The QoS control channel 122 sends the QoS parameter setting of the QoS controller server 132 of the application chip 130 to the QoS controller client 102, or sends the QoS and the network event of the QoS controller client 102 of the modem chip 100 to the QoS controller server 132. The audio channel 124 interconnects the audio codec 134 of the application chip 130 and the audio socket 103 of the modem chip 100. The video channel 126 interconnects the video codec 135 of the application chip 130 and the video socket 104 of the modem chip 100. The SIP signaling channel 128 delivers an SIP message from the SIP stack 133 of the application chip 130 to the modem chip 100. Herein, the WinSock 136 of the application chip 130 is used to deliver the SIP signaling.

The application UI 131 allows various application programs to run with the aid of functions provided from the platform in a wireless Internet standard platform environment.

The QoS controller server 132 sends the QoS parameter setting to the QoS controller client 102 over the control channel 122, controls activation/deactivation of the QoS, controls an open or close feature of a remote socket, and receives and processes the QoS event from the QoS controller client 102.

The audio codec 134 converts an analog voice signal to a digital voice signal or converts a digital voice signal to an analog voice signal using Pulse Code Modulation (PCM). The video codec 135 converts an analog video signal to a digital video signal or converts a digital video signal to an analog video signal using the PCM.

The WinSock 136 provides the interface for the communication between the processes based on the OS (e.g., Windows Mobile) run by the application chip 130. That is, the application programs communicate based on the corresponding port number generated by the WinSock 136.

The SIP stack 133 performs interface functions accessible by the application program and the corresponding SIP processing function. For example, the SIP stack 133 continuously determines an event, such as an SIP message reception or error, and processes the corresponding event. The SIP stack 133 also encodes or decodes a message header and a message body according to the SIP protocol. The SIP standard defines layers and objects of transport, transaction, and dialog.

As stated above, by use of the packet filter 105, the media traffic flow of the received IP packet is delivered to the audio and video sockets 103 and 104 and the SIP signaling is delivered to the WinSock 136 of the application chip 130.

The OS adopted by the application chip 130 can employ a general OS, such as Windows Mobile or Linux.

FIG. 2 is a diagram of a video telephony procedure of a QoS for data service according to an exemplary embodiment of the present invention.

Referring to FIG. 2, to register to a SIP server as executing a video telephony application, the SIP stack 133 sends a SIP request message to the SIP server in step 200. The SIP stack 133 sends the SIP request message to the SIP server via the WinSock 136.

In step 202, using the WinSock 136, the SIP stack 133 sends a SIP Invite message to the SIP server and receives SIP Status: 200 OK from an opponent terminal or a media gateway in step 204. The 200K message includes the IP address and the port number of the opponent terminal or the media gateway.

In step 206, the QoS controller server 132 sends the QoS parameter, the IP address, and the port number of the opponent to the QoS controller client 102 over the control channel 122. The QoS controller client 102 controls the EVDO module 107 based on this information.

In step 208, the EVDO module 107 conducts the QoS negotiation with an access network and concurrently sends the parameter required for the QoS between the access network and the Packet Data Serving Node (PDSN) using a Resource Reservation Protocol (RSVP).

When the modem chip 100 receives a Reservation On message from the access network, the QoS controller server 132 instructs the QoS controller client 102 to open the media sockets 103 and 104 in step 210.

In step 212, the packet filter 105 forwards the media packet received from the access network to the audio and video sockets 103 and 104 or forwards the IP packets, such as RTCP packet or SIP signaling, to the WinSock 136 of the application chip 130 by filtering the packet.

FIG. 3 is a flowchart of a method for supporting a QoS for data service in a portable terminal using two different OSs according to an exemplary embodiment of the present invention.

Referring to FIG. 3, the QoS controller client 102 receives the QoS parameter from the application chip 130 and controls the modem chip 100 with the received QoS parameter in step 300.

In step 302, the packet filter 105 determines whether the packet received from the access network is the audio and video packet. If it is determined in step 302 that the packet is the audio and video packet, the packet filter 105 forwards the packet via the audio and video sockets 103 and 104 of the modem chip 100 in step 304.

In contrast, if it is determined in step 302 that the packet is not the audio and video packet (e.g., RTCP packet or IP packet), the packet filter 105 forwards the packet via the WinSock 136 of the application chip 103 in step 306.

As set forth above, by defining the novel software architecture for the two CPUs to support the QoS, the video telephony and the VoIP service using the QoS based on the EVDO are feasible in the portable terminal using two different OSs.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A portable terminal for supporting a data service for Quality of Service (QoS) using two different Operating Systems (OSs), the portable terminal comprising:

a QoS controller server, disposed in an application chip of the portable terminal, for sending a QoS control signal to a QoS controller client of a modem chip of the portable terminal;

the QoS controller client, in the modem chip, for controlling the modem chip based on the control signal received from the QoS controller server of the application chip; and a memory, included in the portable terminal, for providing a channel between the application chip and the modem chip.

2. The portable terminal of claim 1, wherein the QoS controller server sends a QoS parameter setting and a command to the QoS controller client of the modem chip over a QoS control channel.

3. The portable terminal of claim 1, wherein the QoS controller server receives a network event from the QoS controller client of the modem chip.

4. The portable terminal of claim 1, wherein the QoS controller server activates and deactivates the QoS, and opens and closes a remote socket.

5. The portable terminal of claim 1, wherein the QoS controller client sends a network event to the QoS controller server of the application chip over a QoS control channel.

6. The portable terminal of claim 1, further comprising, in the modem chip:
   an audio socket linked to an audio channel for sending an audio signal to an audio codec of the application chip or for receiving an audio signal from the audio codec of the application chip;
   a video socket linked to a video channel for sending a video signal to a video codec of the application chip or for receiving a video signal from the video codec of the application chip; and
   a packet filter for filtering a packet received from an access network, and for forwarding the packet to the audio socket and the video socket or for forwarding the packet to a socket of the application chip over an application signaling channel.

7. The portable terminal of claim 1, further comprising, in the application chip:
   an audio codec for sending an audio signal to an audio socket of the modem chip, which is linked to an audio channel;
   a video codec for sending a video signal to a video socket of the modem chip, which is linked to a video channel; and
   a socket linked to an application signaling channel for sending and receiving a packet to and from the modem chip.

8. The portable terminal of claim 1, wherein the memory configures:
   an audio channel for interconnecting an audio codec and an audio socket;
   a video channel for interconnecting a video codec and a video socket;
   a QoS control channel for sending the control signal of the QoS controller server to the QoS controller client; and
   an application signaling channel for sending an application signal.

9. The portable terminal of claim 8, wherein the application signaling channel is linked to a socket of the application chip, and
   wherein the audio channel and the video channel are linked to a socket of the modem chip.

10. The portable terminal of claim 1, wherein OSs run by the modem chip and the application chip are different from each other.

11. A method for supporting a data service for Quality of Service (QoS) in a portable terminal using two different Operating Systems (OSs), the method comprising:
   sending, at a QoS controller server disposed in an application chip of the portable terminal, a QoS control signal to a QoS controller client of a modem chip of the portable terminal;
   controlling, at the QoS controller client in the modem chip, the modem chip based on the control signal received from the QoS controller server of the application chip; and
   providing, at a memory of the portable terminal, a channel between the application chip and the modem chip.

12. The method of claim 11, wherein the sending of the QoS control signal to the QoS controller client of the modem chip sends a QoS parameter setting and a command to the QoS controller client of the modem chip over a QoS control channel.

13. The method of claim 11, further comprising:
   receiving, at the QoS controller server, a network event from the QoS controller client of the modem chip.

14. The method of claim 11, further comprising:
   activating and deactivating the QoS and opening and closing a remote socket at the QoS controller server.

15. The method of claim 11, further comprising:
   sending, at the QoS controller client, a network event to the QoS controller server of the application chip over a QoS control channel.

16. The method of claim 11, further comprising, in the modem chip:
   sending, at an audio socket linked to an audio channel, an audio signal to an audio codec of the application chip or receiving an audio signal from the audio codec of the application chip;
   sending, at a video socket linked to a video channel, a video signal to a video codec of the application chip or receiving a video signal from the video codec of the application chip; and
   filtering, at a packet filter, a packet received from an access network, and forwarding the packet to the audio socket and the video socket or forwarding the packet to a socket of the application chip over an application signaling channel.

17. The method of claim 11, further comprising, in the application chip:
   sending, at an audio codec, an audio signal to an audio socket of the modem chip, which is linked to an audio channel;
   sending, at a video codec, a video signal to a video socket of the modem chip, which is linked to a video channel; and
   linking a socket to an application signaling channel for sending and receiving a packet to and from the modem chip.

18. The method of claim 11, wherein the memory configures:
   an audio channel for interconnecting an audio codec and an audio socket;
   a video channel for interconnecting a video codec and a video socket;
   a QoS control channel for sending the control signal of the QoS controller server to the QoS controller client; and
   an application signaling channel for sending an application signal.

19. The method of claim 18, wherein the application signaling channel is linked to a socket of the application chip, and
   wherein the audio channel and the video channel are linked to a socket of the modem chip.

20. The method of claim 11, wherein OSs run by the modem chip and the application chip are different from each other.

21. A method for supporting Quality of Service (QoS) of video telephony in a portable terminal using two different Operating Systems (OSs), the method comprising:
   sending, at an application chip of the portable terminal, a Session Initiation Protocol (SIP) Invite message to an SIP server and receiving an SIP 200K message through a socket;
   after receiving the SIP 200K message, sending, at the application chip, an Internet Protocol (IP) address and a port number to a modem chip of the portable terminal; and
   performing, at the modem chip, QoS negotiation with an access network based on the IP address and the port number.

22. The method of claim 21, further comprising:
when receiving a Reservation On message, instructing, at the application chip, the modem chip to open a media socket.

23. The method of claim 21, further comprising:
filtering and sending, at the modem chip, a packet received from a network to a media socket or an SIP signaling channel.

24. The method of claim 21, further comprising:
sending, at the application chip, a media packet over audio and video channels linked to a media codec.

* * * * *